P. B. WALLACE.
DUMPING DEVICE FOR ROPEWAYS.
APPLICATION FILED APR. 28, 1915.
1,170,861.
Patented Feb. 8, 1916.
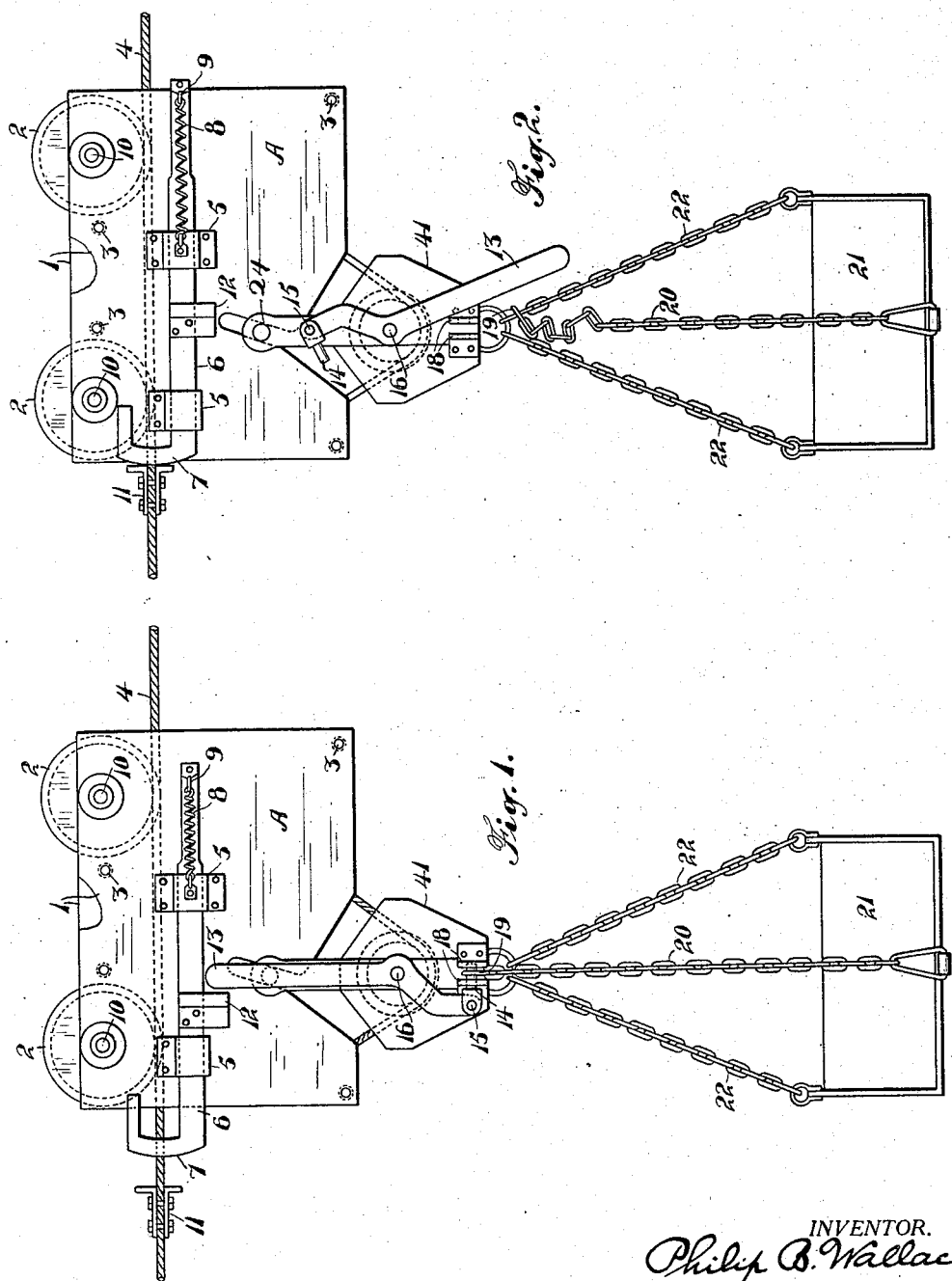
INVENTOR.
Philip B. Wallace
BY Lincoln Sonntag
ATTORNEY

UNITED STATES PATENT OFFICE.

PHILIP B. WALLACE, OF SAN FRANCISCO, CALIFORNIA, ASSIGNOR TO CHADWICK & SYKES, INC., OF SAN FRANCISCO, CALIFORNIA, A CORPORATION OF CALIFORNIA.

DUMPING DEVICE FOR ROPEWAYS.

1,170,861. Specification of Letters Patent. Patented Feb. 8, 1916.

Application filed April 28, 1915. Serial No. 24,560.

*To all whom it may concern:*

Be it known that I, PHILIP B. WALLACE, a citizen of the United States, residing at the city of San Francisco, in the county of San Francisco and State of California, have invented certain new and useful Improvements in Dumping Devices for Ropeways, of which the following is a specification.

My invention relates to improvements in dumping devices for ropeways.

The object of my invention is to provide an improved dumping device for ropeways which operates automatically, requiring no rope or manually operated mechanism to actuate it, and which has no connection with any independent device, the same containing with the carrier all elements for its operation.

My invention consists in the improved combination and arrangement of parts shown in the accompanying drawing, described in the following specification, and claimed in the appended claims.

Referring to said drawing, Figure 1 is a side view of the device when the container is supported for carrying the load, and Fig. 2 is a view of said device when the container is released for emptying the load.

In the said figures A represents a carrier consisting of two plates 1, which are spaced from each other a sufficient distance, and secured by means of bolts 3 running between the same and secured in the walls thereof, the said carrier having also other parts as hereinafter mentioned. The said carrier is preferably supported on a cable 4, by means of sheaves 2 rotatably mounted on pins 10 penetrating said walls, and within which they work. The carrier A is provided with clips 5 bolted to side plate 1 as shown, and said clips 5 slidably support bar 6 extending therethrough. The bar 6 has an upwardly and inwardly bent end 7, and has at its other end spring 8 which is secured thereto by a ring, the said spring extending to clip 5 nearest thereto, to which it is also preferably secured by a ring. On the cable 4 is adjustably secured by nuts a bumper 11, which has upwardly and downwardly bent portions provided for contact, as shown, such contact being with end 7 of bar 6 on the approach of carrier A to said bumper. Bar 6 has a branch 12 secured thereto, which is of sufficient length to strike the upper end of lever 13 when said lever or bar 13 is in the position shown in Fig. 1 and the said bar 6 is caused to approach to the right. The bar 13 has at its lower a pin 14 with forked ends or portions wherein the lower extremity of said bar 13 is connected by a pin 15 as shown. The said bar 13 is free to revolve clockwise on a pin 16 mounted in block 41 when given a sufficient blow on contact with branch 12 of bar 6. In Fig. 1 the bar 13 is shown in position for pin 14 inserted in the holes of angle plates 18 to support ring 19 at the end of point chain 20. The bar 13 has its lower portion extending downwardly from pin 16 curved as shown in Fig. 1.

The operation of the dumping device is as follows: When the carrier A is carrying a load contained in the container 21, supported by back chains 22 and point chain 20 with end ring 19 supported on pin 14 between angle plates 18, the approach to and contact with the bumper or stop 11 of the carrier pushes bar 6 to the right as illustrated in Fig. 2, causing the projection or branch 12 to strike the upper end of bar 13 as shown in Fig. 1 and causing bar 13 to rotate on said pin 16 with the result of pulling pin out of position in the holes of angle plates 18 and permitting the ring 19 of point chain 20 to fall as shown in Fig. 2, thereby emptying the container 21. Thereupon the carrier A is drawn to the right and returned to the point of loading for repeating the operation, and as the carrier leaves contact with the bumper 11, the spring 8 returns the bar 6 to the position shown in Fig. 1. Bar 13 normally remains in the position shown in Fig. 2 until it is replaced by hand to the position shown in Fig. 1. The block 41 is suitably supported by a pulley rotatably mounted on pin 16 and a cable as shown. Pin 24 rests in the guide of plate 1 as shown.

I claim:

1. In a dumping device for ropeways a carrier having two plates spaced apart movably mounted on a cable, a bumper adjustably secured to said cable, a bar having a downwardly extending branch and slidably secured to one side of said carrier and having one end engageable with said bumper and its other end resiliently connected to said carrier, a block suspended from said carrier, a lever pivotally connected to said block having one end engageable with said branch and its other end provided with a laterally extending pin, angle plates secured to the lower end of said block and having openings penetrable by said laterally extending pin, and a container suspended from said block and having means disengageably connected to said pin between said angle plates for supporting part of said container.

2. In a dumping device for ropeways in combination with a bumper adjustably secured to a cable, a carrier having two plates spaced apart movably mounted on said cable, a bar having a downwardly extending branch and slidably secured to one side of said carrier and having one end provided with a bent portion engageable with said bumper, and its other end resiliently connected to said carrier, a block suspended from said carrier, a lever pivotally connected to said block having one end engageable with said branch and its other end provided with a laterally extending pin, angle plates secured to the lower end of said block and having openings penetrable by said laterally extending pin, and a container suspended from said block and having means disengageably connected to said pin between said angle plates for supporting part of said container.

3. In a dumping device for ropeways a carrier having two plates spaced apart movably mounted on a cable, a bumper adjustably secured to said cable, a bar resiliently connected to said carrier having a laterally extending branch and slidably secured to said carrier and having one end engageable with said bumper, a block suspended from said carrier, a lever pivotally connected to said block having one end engageable with said branch and its other end provided with a support, and a container suspended from said block and having means disengageably connected to said support for supporting part of said container.

In testimony whereof I affix my signature in presence of two witnesses.

PHILIP B. WALLACE.

Witnesses:
    MARY L. MOSS,
    SARA E. BATEMAN.

Copies of this patent may be obtained for five cents each, by addressing the "Commissioner of Patents, Washington, D. C."